INVENTOR.
JAMES A. PEUGH
BY
ATTORNEYS

United States Patent Office 3,530,365
Patented Sept. 22, 1970

3,530,365
PHASE SHIFTING NETWORK FOR PRODUCING A PHASE OF ANY VALUE FROM 0° to 360°
James A. Peugh, 952 Moana St., San Diego, Calif. 92106
Original application Sept. 27, 1967, Ser. No. 671,158. Divided and this application Nov. 12, 1968, Ser. No. 774,736
Int. Cl. H02m 5/00
U.S. Cl. 321—54                          2 Claims

ABSTRACT OF THE DISCLOSURE

A phase-shifting network comprises means for generating two quadrature phases; then by 180° phase-splitting, four vectors 90° apart are formed. By vector addition, a phase of any value from 0° to 360° is easily produced.

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

This application is a division of application, Ser. No. 671,158, filed Sept. 27, 1967, and now Pat. No. 3,447,125.

BACKGROUND OF THE INVENTION

It is known in sonar that the direction of a remote point source of signal can be determined at a receiving station by detecting the signal at each of an array of hydrophones, and shifting the phase of each signal an optimum amount, for a given direction, to bring all signals into phase. The amount of phase shift is related to the direction of the received signal. In such systems the rather bulky phase-shifting networks are located at the receiving station. In some cases it is desirable to place the phase-shifting networks at the transmitter so that any tunable receiver could identify the beam by its frequency and, hence, identify its position with respect to the array at the transmitter.

SUMMARY OF THE INVENTION

The objects of this invention are attained by providing a transmitting station with the usual array of uniformly spaced transmitting transducers and with sources of frequency $f_1, f_2 \ldots f_n$. Each frequency is shifted in phase a plurality of steps so as to produce a series of voltages displaced equal increments of phase. The voltages of the series are applied, respectively, to the tranducers of the array. The number of transducers is equal to, or a multiple of, the number of increments of phase. From the array can be transmitted a plurality of beams each characterized by one of the frequencies $f_1$ to $f_n$, and each directed in a differeit direction, so that a turnable receiver at a remote point can identify each beam. A novel phase system is employed including a quadrature phase-shifter, two 180° phase-splitters, and resistive networks for vectorially adding the four 90° voltages.

OBJECTS OF THE INVENTION

A specific object of this invention is to provide a direction finding system in which a transducer array and the phase-shifting networks are located at the signal source rather than at the receiver.

A more specific object of this invention is to provide a simplified phase-shifting system.

Other objects and features of this invention will become apparent to those skilled in the art by referring to the specific embodiments described in the following specification and shown in the accompanying drawings.

DESCRIPTION OF THE PREFERRED EMBODIMENTS

Figure 1:
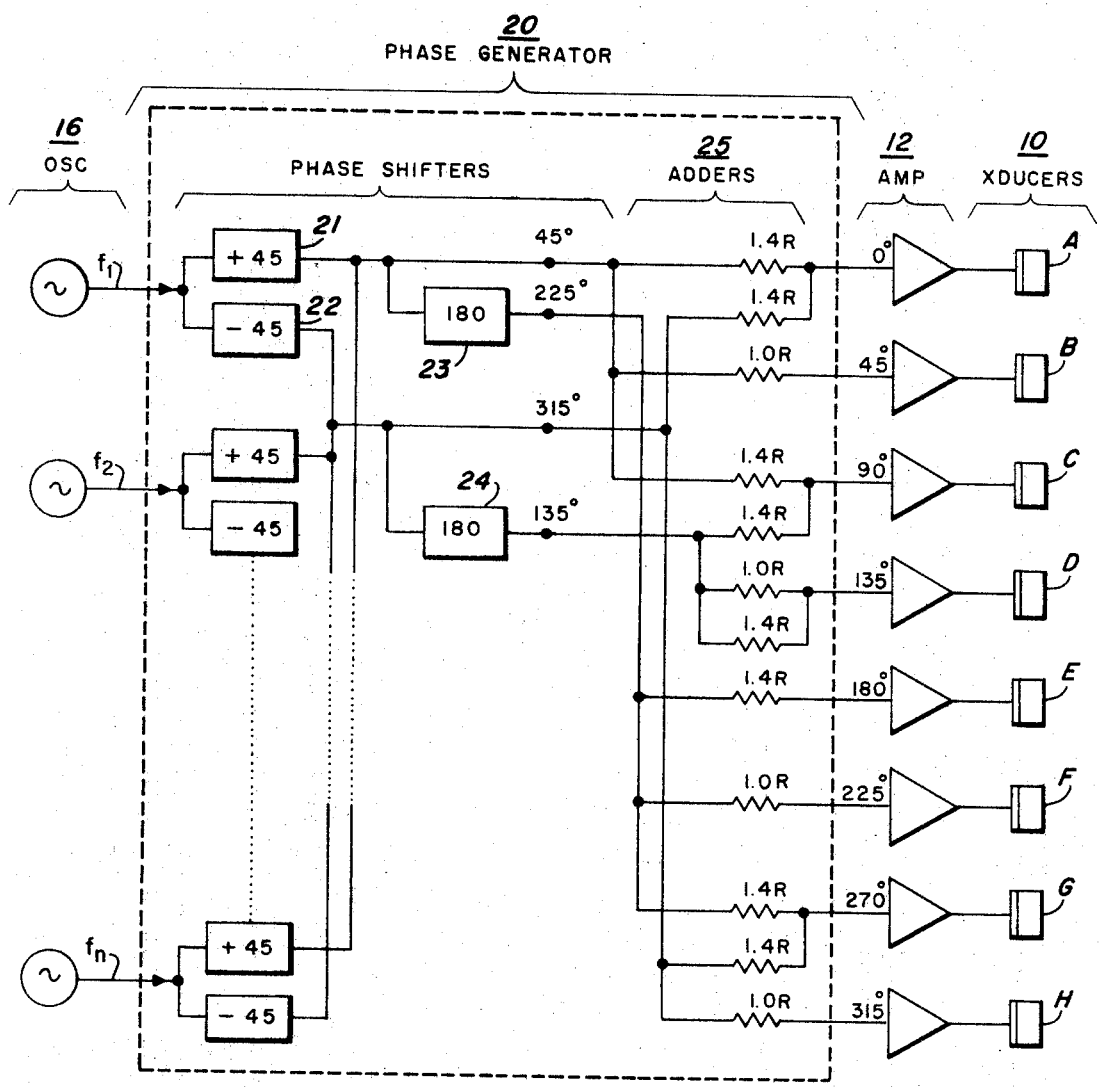
FIG. 1 is a block diagram of one preferred embodiment of this invention.

In FIG. 1 is shown an array 10 of transmitting transducers. In this embodiment the array is assumed to be inline or lienar. The transducers A to H, inclusive, are eight in number, although this number is not critical. As will be shown, the minimum number of transducers is determined primarily by the number of increments of phase into which the signal may be conveniently divided. For increased beam resolution, transducers can be added onto the end of the array shown, each added transducer being connected in parallel with the corresponding transducer A to H of the first group.

Figure 3:
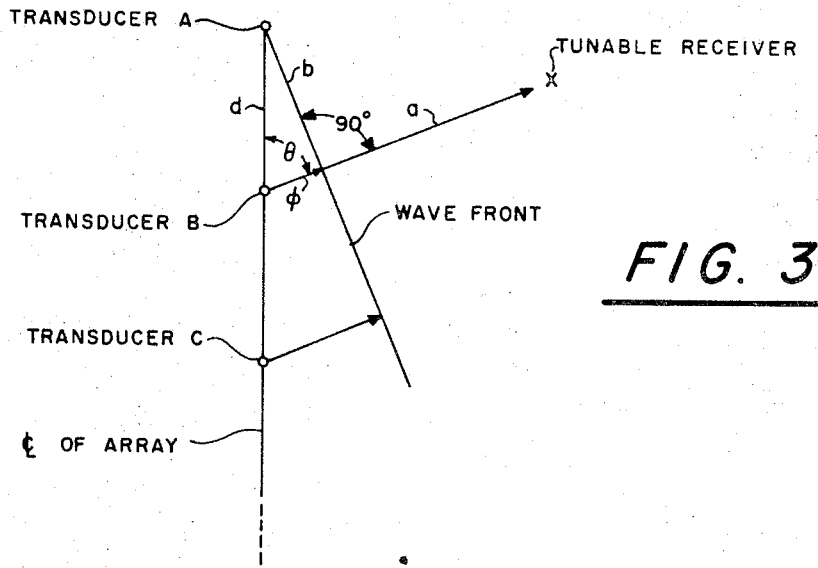
FIG. 3 is a geometric diagram of the wave front producing arraw of FIG. 1.

In FIG. 3 is shown the simple geometry involved in producing and transmitting a so-called beam. The direction from the array to the receiver is shown by line $a$, and the angle of line $a$ with the center line of the array is angle $\theta$. The line $b$ is drawn through one transducer, (A), which will be referred to as the reference transducer, and is drawn perpendicularly to the line $a$ to the receiver. Signals from all of the transducers must arrive in phase at line $b$ to produce the beam or strongest signal at any receiver along line $a$. The distance from transducer B to line $b$, can be in terms of phase displacement between the signal at transducers A and B to meet the in-phase requirement at the wave front. From the right angle triangle at FIG. 3 the following expression can be written $$\cos \theta = \frac{C\phi}{2\pi f d}$$

where C is the velocity of sound in water, $d$ is the distance between transducers A and B, and $f$ is the frequency of the signal applied to the transducers. A similar expression can be written for the triangle involving transducer C where the distance now is $2d$ instead of $d$. Since C and $2\pi$ are fixed and $\phi$ can be assumed to be constant, the angle $\theta$ can be equated to frequency $f$ as $\cos \theta = K/f$. That is to say, for the given direction $\theta$ there is but one frequency, $f$, which will create a beam in that direction. For a different position of the receiver and for a different angles $\theta$, another frequency $f$ is required.

As stated, the distance $\phi$ is a measure in degrees or radians of the phase of the electrical signal required at a transducer B with respect to the signal at transducer A. Let it be assumed that this phase is 45 degrees for each transducer with respect to the next adjacent transducer. If eight transducers are assumed in the array, then eight increments of phase, or 360° total is required. The phase increments and the number of transducers may be selected at will.

Figure 2:
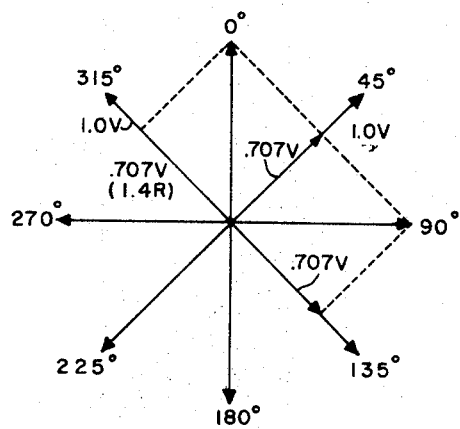
FIG. 2 is a rotating vector diagram of the signal voltages at the several transducers of the array of FIG. 1.

In FIG. 1, $n$ generators 16 are shown for generating frequencies $f_1$ to $f_n$. The number of frequencies correspond to the number of beams desired to be transmitted from the array. At 20 is shown in block diagram one specific network for producing eight equally spaced phases for each of the $n$ frequencies of generators 16. To produce the eight 45-degree increments, quadrature voltages are first produced for each frequency. Then each of the 90-degree voltages are split, or reversed, to produce two additional phases, and finally the four phases are vectorially added to produce eight phases. More specifically, each frequency input is connected to two phase shifters, 21 and 22. The phase can be advanced 45 degrees, in shifter 21, with a simple series condenser and resistor, as well known. The same frequency also can be retarded 45 degrees, in shifter 22, by a similar series reactance network. Alternatively, the 90° shift can be made in a single network. Similar phase shifters are connected to the output of each of the frequency sources 16. The leading voltages are all connected together and the lagging voltages are all connected together and are, respectively, applied to the phase splitting devices 23 and 24. Assuming a reference or zero phase at the frequency source, the output of shifter 21 is then +45 degrees and can be applied directly to the "45" terminal. If the +45 degree voltage is reversed in phase in device 23, a phase of 225 degrees is produced whereas the lagging 45 degree voltage or +315 degrees is reversed in phase to produce a 135 degree voltage. In the vector diagram of FIG. 2 is shown the four voltages of phases 45 degrees, 135 degrees, 225 degrees, and 315 degrees.

According to this invention any number of additional voltages with intermediate phases are obtained by vectorially adding appropriate pairs of the first four voltages. If, for example, equal amounts of the 45 and 135 degree voltages are added, a 90 degree voltage is obtained. If the four principal voltages are unity in magnitude the vector addition can be accomplished to obtain unity voltage on the 90 degree vector by adding .707 volt from each of the adjacent vectors. At 25 is shown resistance type adding circuits for producing the eight phase voltages, although reactive circuits could be employed. To produce the normalized or 1.0 and .707 volt, the resistances must be 1.0 or 1.4 units of resistance, R.

For example, the 45 degree voltage applied to transducer B is obtained directly from the 45 *degree point in the phase splitter* through a 1.0R resistor, and the normalized one volt signal is appropriately amplified at 12 and applied to the transducer B. The zero phase for the transducer A, however, must be obtained by vectorially adding the 45 and 315 degree voltages through 1.4R resistors which when added as shown in FIG. 2 produce the normalized one volt signal, which also is amplified appropriately in amplifier 12 and applied to transducer A. Similar additions are required for the 90, 180, and 270 degree components.

Since the distance $\phi$, FIG. 3 is a direct function of the signal frequency, the in-phase additions of the several transducers of the array along the wave can be accomplished at only one frequency, $f$, for one direction $\theta$. It follows that the tunable receiver at the remote point can determine which beam it is on by tuning to the strongest signal and noting the frequency of that signal. The tuning dial could, conveniently, be calibrated in terms of direction $\theta$.

Figure 4:
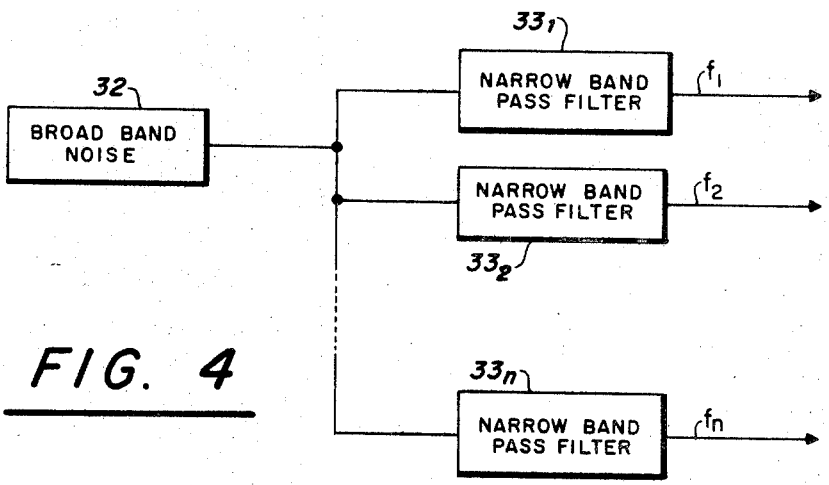
FIG. 4 is an alternative signal source adapted to the system of FIG. 1.

Instead of separate generators 16, a single broad band noise source 32 may be employed as shown in FIG. 4. Then, with a series of differently tuned narrow band pass filters 33 the several frequencies $f_1$ to $f_n$ can be isolated. Such frequencies should of course be leveled in amplitude, whereupon they can be divided into phase components and added as in FIG. 1.

What is claimed is:
1. A multiple frequency phase shifter comprising;
sources of signal voltages of progressively different frequencies,
means coupled to each source, respectively, for generating two quadrature voltages for each of said different frequencies,
two phase splitters, each splitter for generating voltages of 0 and 180 degrees for each applied frequency, all frequencies of like phase being applied to one phase splitter and all frequencies of the quadrature phase being applied to the other phase splitter to genertate four voltages of phases, 90 degrees apart, for each frequency, and
means for vectorially adding portions of voltages of each adjacent pairs of phases for generating four additional voltages of phase inermediate the phases of the first mentioned four voltages.
2. A phase shifter system comprising;
a signal source of predetermined voltage, phase, and frequency,
means coupled to said source for generating two voltages of quadrature phase,
two phase splitters connected, respectively, to the outputs of said quadrature phases for generating four voltages of 0°, 90°, 180°, and 270° phases at said predetermined frequency, and
means for vectorially adding portions of voltages of any adjacent pair of said four phases for generating additional voltages of any phase between 0° and 360°.

References Cited
UNITED STATES PATENTS

| | | | |
|---|---|---|---|
| 3,005,960 | 10/1961 | Levenson | 331—45 XR |
| 3,065,403 | 11/1962 | Lehmann et al. | 323—122 |
| 3,090,923 | 5/1963 | Welty | 331—45 XR |
| 3,202,932 | 8/1965 | Bones et al. | 331—45 |
| 3,236,949 | 2/1966 | Atal et al. | |
| 3,246,241 | 4/1966 | Colby | 323—122 XR |
| 3,267,358 | 8/1966 | Anderson | 321—54 XR |
| 3,465,337 | 9/1969 | Tanaka et al. | 340—6 XR |

WILLIAM M. SHOOP, JR., Primary Examiner

U.S. Cl. X.R.

323—122; 331—45; 340—6